United States Patent [19]

Lavalerie

[11] Patent Number: 4,743,054
[45] Date of Patent: May 10, 1988

[54] DEVICE FOR THE INSTALLATION AND RETENTION OF A SHUTTER PLATE FOR AN OPENING IN AN ENCLOSURE

[75] Inventor: Claude Lavalerie, L'Isle Adam, France

[73] Assignee: Framatome, Courbevoie, France

[21] Appl. No.: 895,624

[22] Filed: Aug. 11, 1986

[30] Foreign Application Priority Data

Aug. 9, 1985 [FR] France ................................ 85 12215
Jan. 10, 1986 [FR] France ................................ 86 00308

[51] Int. Cl.⁴ ............................................. E05C 21/00
[52] U.S. Cl. ................................................ 292/256.67
[58] Field of Search ...................... 292/256.67, 256.63, 292/256.65, 256.69, 342

[56] References Cited

U.S. PATENT DOCUMENTS

| | | | |
|---|---|---|---|
| 2,837,383 | 6/1958 | Skelly | 292/256.67 X |
| 2,937,782 | 5/1960 | Heimberger et al. | 292/256.63 X |
| 3,429,476 | 2/1969 | Hunter | 292/256.67 |
| 4,524,729 | 6/1985 | Hill, Jr. et al. | 292/256.67 X |

FOREIGN PATENT DOCUMENTS 2340489 2/1977 France .
2554208 1/1986 France .

Primary Examiner—Richard E. Moore
Attorney, Agent, or Firm—Pollock, Vande Sande & Priddy

[57] ABSTRACT

This device for the installation and retention of a shutter plate (11) for an opening (7) comprises a carrier ring (21) provided with an inner channel (22) with an inclined face (23), positioned within which are clamping wedges (25) which bear upon the periphery of the shutter plate (11) and which, under the action of locking screws (27) which interact with the carrier ring (21) move individually within the said channel in a downward radial direction so as to exert a compressive force on the said shutter plate.

21 Claims, 10 Drawing Sheets

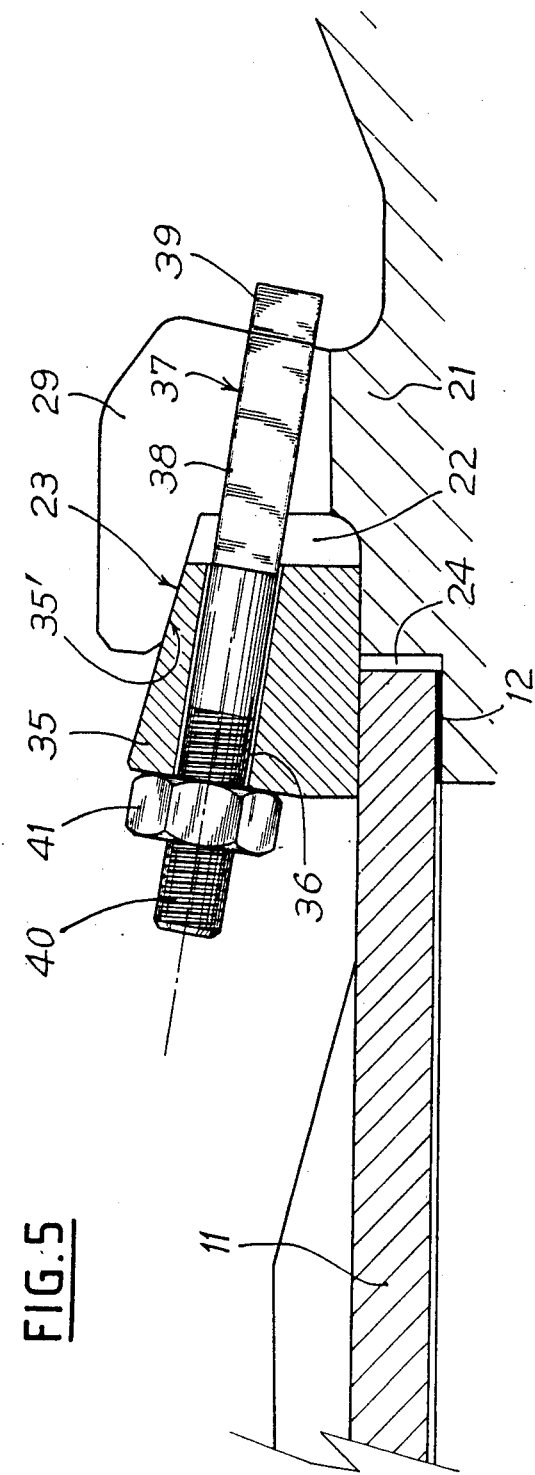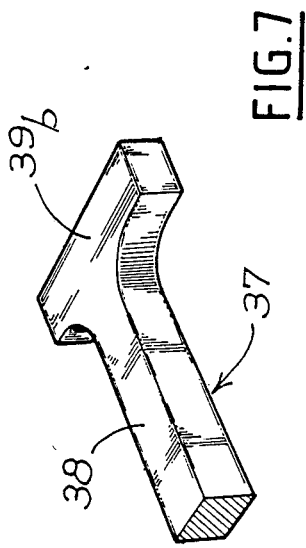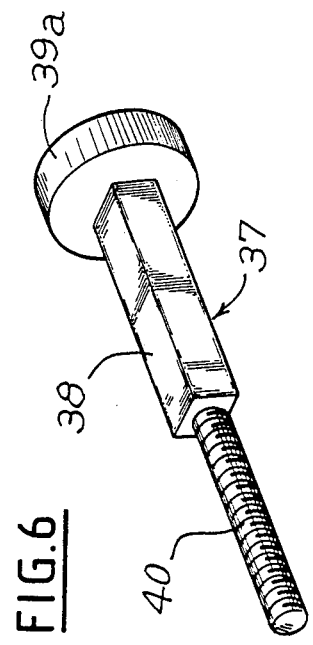

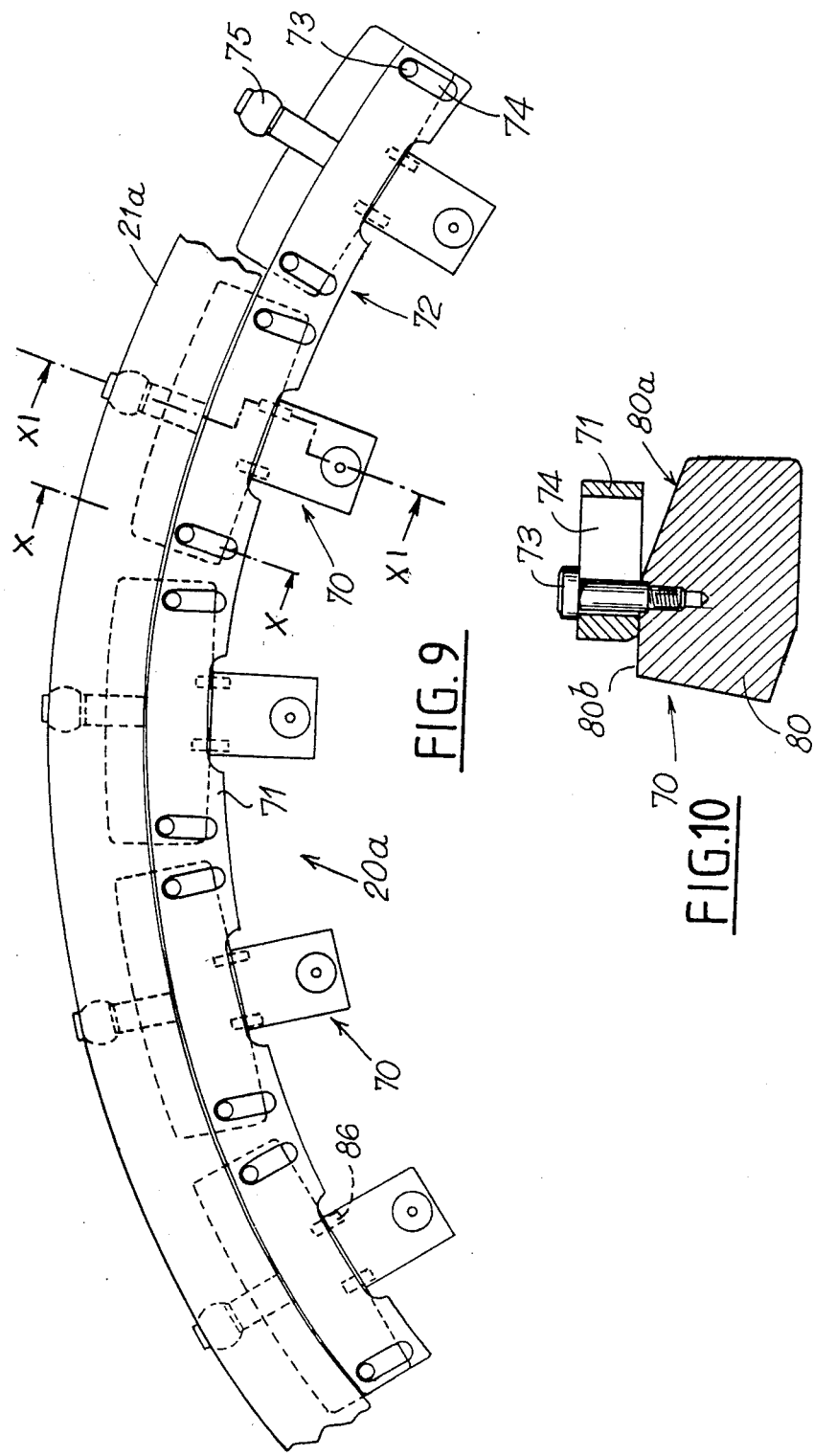

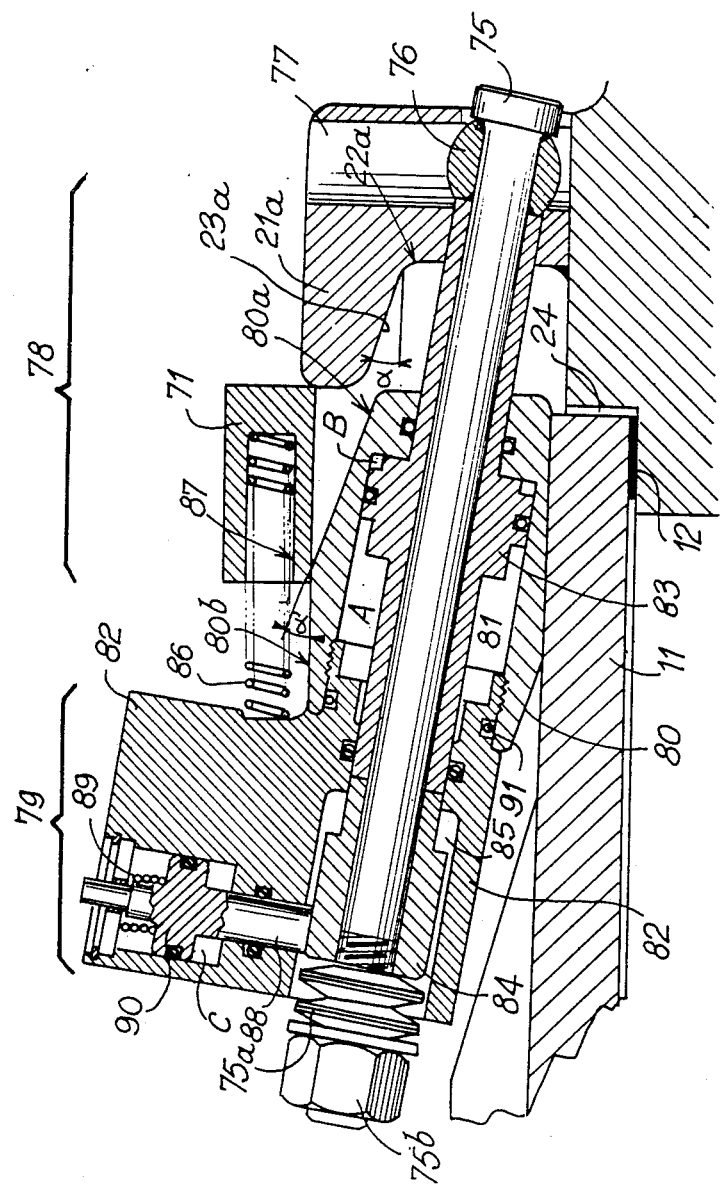

DEVICE FOR THE INSTALLATION AND RETENTION OF A SHUTTER PLATE FOR AN OPENING IN AN ENCLOSURE

FIELD OF THE INVENTION

The present invention relates to a device for the installation and retention of a cover plate intended to shut an orifice made in an enclosure and, more especially, adapted to the temporary shutting of orifices made in the water boxes of steam generators for nuclear power stations.

In fact, such a generator forms a passage for pressurized water which has been heated by contact with the fuel rods of the nuclear reactor and which circulates within a bundle of U-shaped tubes, transmitting its heat to a secondary fluid which is consequently vaporized within the generator. The bundle of U-shaped tubes is supported by a tube plate which along with the bottom of the steam generator defines a hemispherical water box divided into two compartments for the intake and discharge of pressurized, water respectively, each of these compartments comprising an orifice connecting it to the primary circuit of the reactor, whose diameter must be large to accommodate high flow rates.

BACKGROUND OF THE INVENTION

Periodically, it is necessary to gain access to the inside of the water box compartments, for example to carry out checking and maintenance operations, and hence to be able to isolate these compartments from the primary circuit of the reactor when the latter is shut down.

Access to the compartments is gained by means of manholes which must be as small as possible and must also have a diameter which is just large enough for the service engineer to pass through without undue difficulty, thus making it possible to examine and service, if appropriate, the tubes of the tube plate.

Of course, during these operations, the primary fluid circulation circuit is shut down, in order to avoid the risk of hot or warm water entering the water boxes of the steam generator inadvertently. On the other hand, the orifice via which the primary fluid duct discharges has a fairly large diameter, and the risk of the operator or tools falling into the duct must be taken into account. Finally, this wide open orifice is phychologically disturbing, and for all these reasons it is essential to close this orifice as quickly as possible when an operator is to enter the interior of the bottom of the generator.

For this reason, as soon as the service engineer has entered the bottom of the steam generator he fits a shutter plate over the orifice of the primary fluid pipe. However, since the dimensions of this orifice are generally greater than those of the manhole, the plate must be introduced into the bottom in several pieces.

French Pat. FR-A-No. 2,340,489, owned by applicant, describes a shutting device comprising a cover made up of a central member and two C-shaped side members whose dimensions allow them to pass through the manhole. Each side member comprises, on either side of a scalloped-out section, two arms which are articulated at their ends to the corresponding arms of the other member about two hinges whose axes are aligned. The two side members are folded, one on top of the other, to pass through the manhole, and are then opened out to be applied to the bearing surface, each member covering a part of the said surface on either side of the pivoting axis of the hinges, and the central member covering the opening formed by the two scalloped-out sections side by side, and ensuring the rigidity of the assembly.

The main disadvantage of this type of shutter plate lies in the method by which it is fastened directly by means of screws. In fact, the latter are fitted into the periphery of the plate in a perpendicular direction to the latter and are then screwed into the circular carrier ring which is welded as close as possible to the tube connections. They are thus subjected to various mechanical stresses which arise, produced when the seal is fitted and the effect at the bottom by the pressure of the head of water present in the pipework during the shutdown of the reactor is taken up. These stresses are of a type which in the course of handling operations cause tensile failure of the screws to shock loads on the threads of the holes in the carrier ring, when then lead to long stays in the water box for the removal of the broken parts and for the necessary repairs. In addition, during this restoration the service personnel are subjected to the radioactive environment in the water box.

FR-A-No. 2,554,208 also discloses a shutter device which comprises at least two panels consisting of a light support coated with resin-bonded carbon fibers.

However, in this case it is not possible to make peripheral holes directly in the carbon fiber, as such machining would lead to a significant weakening of the mechanical strength of the shutting device. In addition, the solution which consists in reinforcing the areas around the holes by means of metal parts causes the same problems encountered in the device described above.

SUMMARY OF THE INVENTION

The object of the present invention is to resolve these drawbacks by providing an installation and retention device which meets the above requirements and which makes it possible to ensure that a plate for shutting off the primary pipes of the water box of the steam generator is held in a leakproof manner, while also ensuring a reduction in the magnitude of the clamping stresses exerted on the threads of the screws and the tapped holes. Lastly, the invention makes it possible to reduce servicing times, which for the most part will henceforth be carried out outside the active zone consisting of the said water box of the steam generator.

According to the invention, the carrier ring comprises an internal channel with an inclined face within which there are clamping wedges which bear on the periphery of the shutter plate and which, under the action of locking members which cooperate with the carrier ring, move individually within the said channel in a downward radial direction to exert a compressive force on the shutter plate.

According to one characteristic of the invention, the locking members consist of a series of jacks which are arranged on the periphery of the closing plate, the simultaneous actuation of which obtained by means of a single control, makes it possible to act uniformly, but individually, on each clamping wedge.

According to another characteristic of the invention, the clamping jacks are joined to one another by means of at least one circular crown-ring sector in the form of one or more independent stringers covering the perimeter of the closing plate.

BRIEF DESCRIPTION OF THE DRAWINGS

The invention will be better understood with the help of the following description, which is given solely by way of example and with reference to the attached drawings in which:

FIG. 5 shows a cross-section of a first alternative embodiment of the device according to the invention;

FIGS. 6 and 7 are two perspective views of two versions of clamping screws which can be adapted to the first alternative embodiment of the device;

FIG. 9 is a partial plan view of a third alternative embodiment of the device according to the invention;

FIG. 10 is a view on a larger scale, in a partial section along the line X—X of FIG. 9;

FIG. 11 is a view on a larger scale, in a longitudinal section along the line XI—XI of FIG. 9, showing the clamping device according to the invention in the rest position;

DESCRIPTION OF PREFERRED EMBODIMENTS

Figure 1:
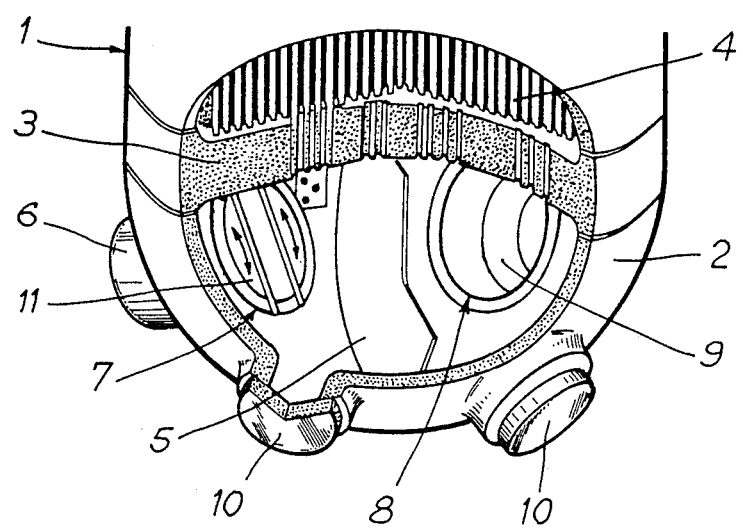
FIG. 1 is a perspective view of the bottom of a steam generator.

Reference will first of all be made of FIG. 1 shows in perspective and diagrammatically a steam generator comprising a cylindrical enclosure 1 which is closed by a bottom 2 in the shape of a spherical dome. A tube plate 3, to which a number of tubes 4 are fitted, is inserted between the cylindrical enclosure 1 and the bottom 2, thus defining a water box, which is divided into two compartments by means of a vertical intermediate partition 5.

The primary fluid, heated in the reactor, arrives via a tube 6 which opens out into the bottom 2 via an orifice 7. It flows through the inverted U-shaped tubes 4 and after having given up its heat to the secondary fluid comes out again into the bottom of the steam generator 2 on the other side of the partition 5, from where it leaves via the opening 8 in a tube 9. In the enclosure 1, the tubes 4 are immersed in the secondary fluid which is thus vaporized.

The hemispherical bottom 2 of the steam generator is thus provided with two orifices 7 and 8 which open into the tubes 6 and 9.

For the purpose of checking and maintaining the primary fluid circuit, the bottom 2 is provided with two orifices 10 placed on either side of the partition 5 and through which a service engineer can enter each of the compartments of the bottom 2.

So as not to reduce the strength of the bottom 2, the access orifices 10 are of the smallest possible size, and their diameter is limited to that which is just large enough to allow the passage of a service engineer wearing a protective one-piece suit.

Before starting the checking and maintenance operations, the service engineer installs and fixes a shutter plate 11, also called a stopper plug, over the inlet orifice 7 or the discharge orifice 8.

In order to be able to pass through the access orifices 10, the shutter plate 11 is, for example, made up of several panels which are assembled together to form a disc having the same diameter as the hole to be shut off. Each of these panels is made of a low density material coated with resin-bonded carbon fibers.

The shutter plate 11 must be held and fastened over the opening by means of a clamping device 20 which, in particular, makes it possible to achieve a very efficient seal due to the effect produced by the pressure of the head of water present in the pipework.

Figure 2:
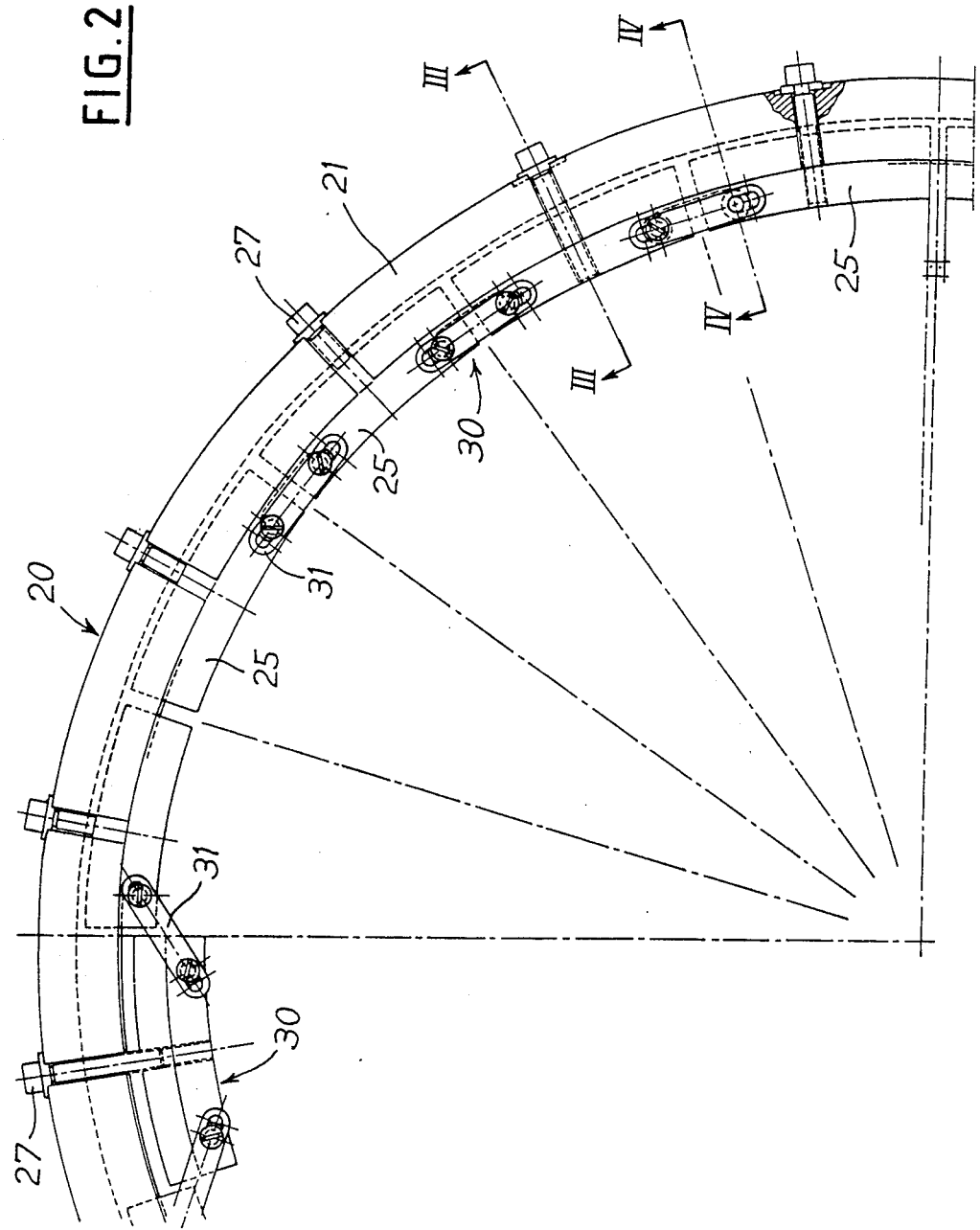
FIG. 2 is a partial view from above of the device according to the invention.
Figure 3:
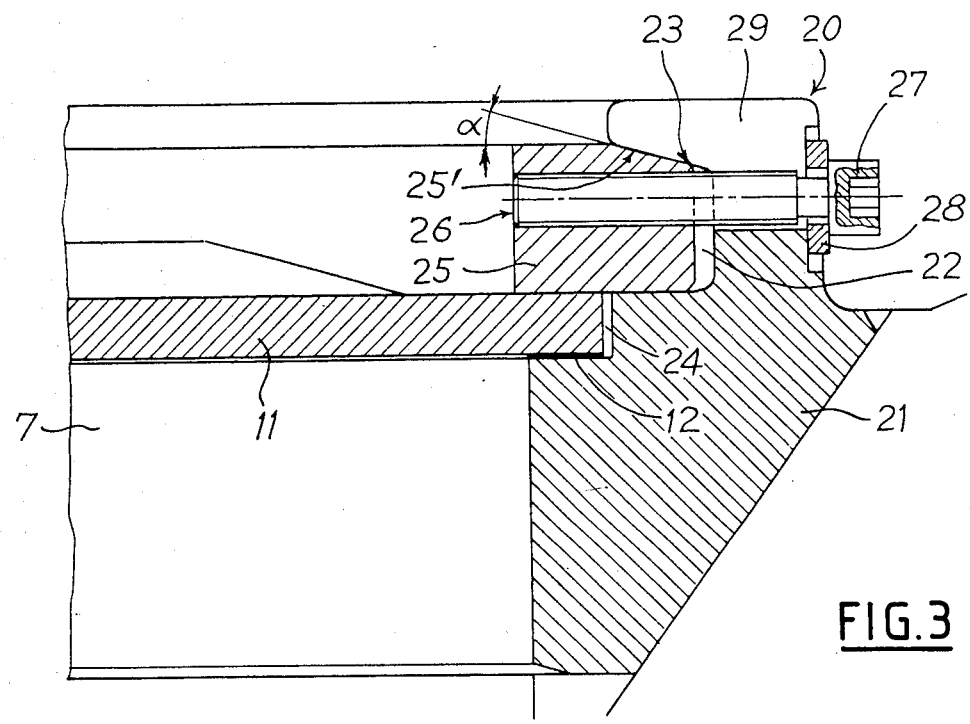
FIG. 3 is a sectional view along the line III—III of FIG. 2.
Figure 4:
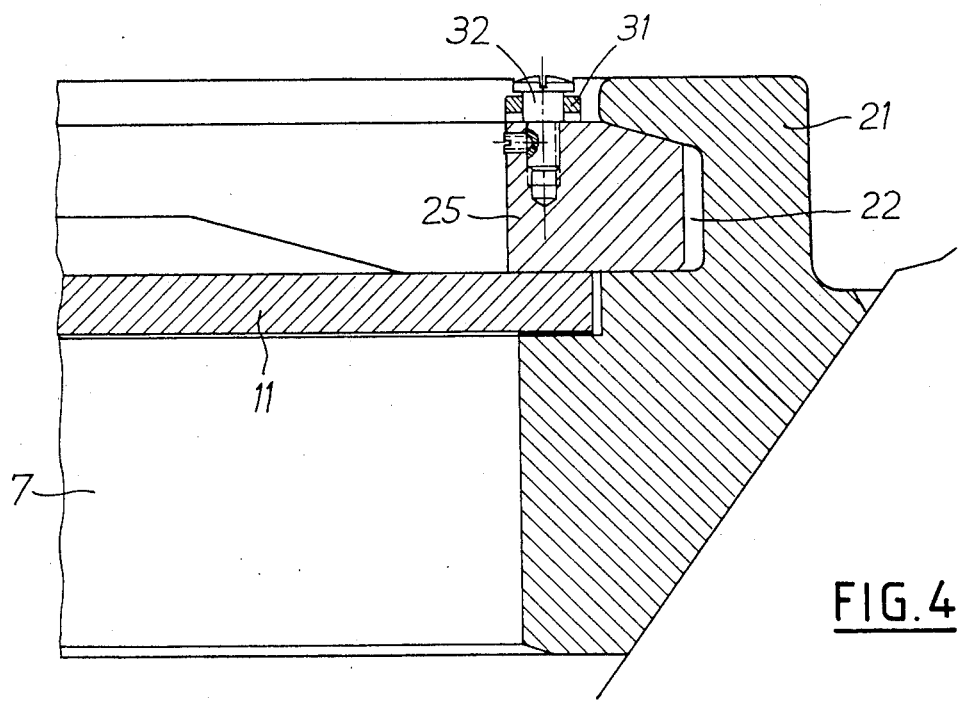
FIG. 4 is a sectional view along the line IV—IV of FIG. 2.

This clamping device 20, shown in FIGS. 2, 3 and 4, comprises a carrier ring 21 which is welded on to the orifices 7 and 8 of the tubes 6 and 9 to be shut.

On its internal lateral face the carrier ring 21 has a trapezoidal channel 22 comprising an inclined face 23 whose angle of inclination $\alpha$ must be greater than the friction angle of the materials coming into contact, so as to avoid any jamming within the said channel. The size of the angle $\alpha$ is approximately 15°.

A recess 24 is situated below the trapezoidal channel 22 and ensures the positioning of the plate 11 and the seating of the seal 12. The depth of the recess 24 is slightly less than the total thickness of the plate 11 and the seal 12.

The shutter plate is held in the recess 24 of the carrier ring 21 by the clamping wedges 25 which take up positions within the trapezoidal channel 22.

As shown in FIG. 2, each clamping wedge 25 consists of a small bar forming an arc of a circular ring whose external contour corresponds to the internal radius of the channel 22.

The upper face 25' of each wedge 25 (FIGS. 3 and 4) is inclined at an angle of the same value as the angle $\alpha$ of the inclined face of the trapezoidal channel 22 of the carrier ring 21, i.e. approximately 15°. Each wedge 25 has a tapped hole 26 in the middle, arranged radially so as to accommodate a locking screw 27 which cooperates with the carrier ring 21 and which is thus oriented along an axis parallel to the plane defined by the sealing plate 11.

On its upper part, the carrier ring 21 has recesses 29 which are spaced at regular intervals around the perimeter so as to allow rapid assembly of the unit: locking screws 27, thrust washers 29 and clamping wedges 25.

The clamping wedges 25 are joined together in pairs so as to form chains 30 made up, for example, of four wedges 25 linked to each other by means of link bars 31 which, as is shown in FIG. 4, are held by and pivoted at each end about a hinge pin constituted by a locating screw 32 fixed in the horizontal part of the upper face of the wedges 25.

Each chain 30 composed of four wedges, as in the previous example, covers a 72° circular arc. In order to cover the entire perimeter of the shutter plate 11, the service engineer must install five chains of four wedges. The chain 30 made up in this way makes it possible to handle four wedges 25 at a time, whose unit weight is not too large, for example of the order of 1 kg which avoids the service engineer having to carry loads which are too heavy. The chains can clearly be made up of a greater or lesser number of wedges.

The link bars 31 serve in particular as location points for the direction for introducing the wedges 25 into the trapezoidal channel 22 and for holding them in line during the positioning of the chains 30 on the carrier ring 21.

The minimum height of the carrier ring 21 has been calculated to allow the screwing in of the screws 27 by means of a remotely-controlled screw-driving machine outside the steam generator.

Installation of the clamping device is carried out in the following way:

After having positioned the seal 12 and the shutter plate 11 in the recess 24 of the carrier ring 21, the service engineer goes on to fit each chain 30 in succession by introducing a locking screw 27, whose end has already been introduced into the tapped hole 26 of the wedge 25, into the recesses 29.

The next procedure in the screwing in of the locking screws 27 by remote control which causes the inclined face 25' of each wedge to slide on the inclined face 23 of the carrier ring 21, which results in a compressive force in the clamping wedges 25 which reacts on the sealing plate 11 which in turn compresses the seal 12.

In this example, the screwing in of the locking screws is carried out from the outside of the carrier ring 21.

FIG. 5 shows a first alternative embodiment of the clamping device which allows the use of a screw-driving device (not shown) and which has no adapting modification when compared to the screw-driving devices used in the prior art.

As previously, the clamping device is made up of the carrier ring 21 comprising the trapezoidal channel 22 and the recess 24 for positioning the seal 12 and the shutter plate 11.

In this case, the clamping wedges 35, also comprising an upper face 35' inclined at the same angle as the inclined face 23 of the trapezoidal channel 22, are equipped with an unthreaded hole 36 whose axis is inclined relative to the plane defined by the shutter plate 11.

Fitting of the wedge 35 within the trapezoidal channel 22 is carried out by means of a screw 37 which is also positioned in the recess 29 of the carrier ring 21 and whose shaft 38 is introduced into the unthreaded hole 36 of the wedge 35.

The stop head 39 of the locking screw 37 is placed outside the carrier ring 21 and the threaded end 40 of the screw 37 protrudes from the unthreaded hole 36 towards the inside of the carrier ring 21.

Locking of the wedge 35 is achieved by a nut 41 which is screwed onto the threaded end 40 of the screw 37.

Thus, the screwing on of the nut 41 is carried out inside the carrier ring 21 and the inclination of the locking screw 37 makes this screwing appreciably easier.

FIGS. 6 and 7 show, respectively, a locking screw 37 with a cylindrical head 39a, and a screw with a T-shaped stop head 39b.

The self-locking square shape of the shaft 38 is intended to prevent rotation of the screw while the nut 41 is being screwed on.

Figure 8:
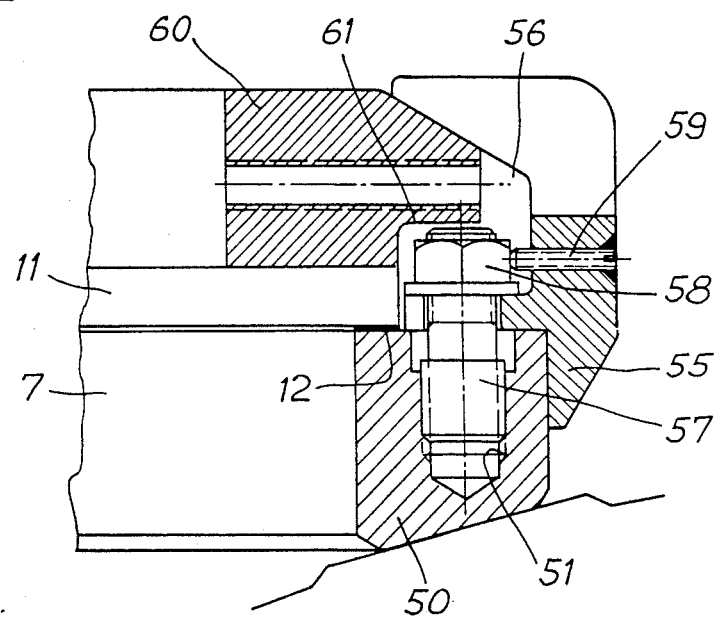
FIG. 8 shows a cross-section of a second alternative embodiment of the device according to the invention.
Figure 12:
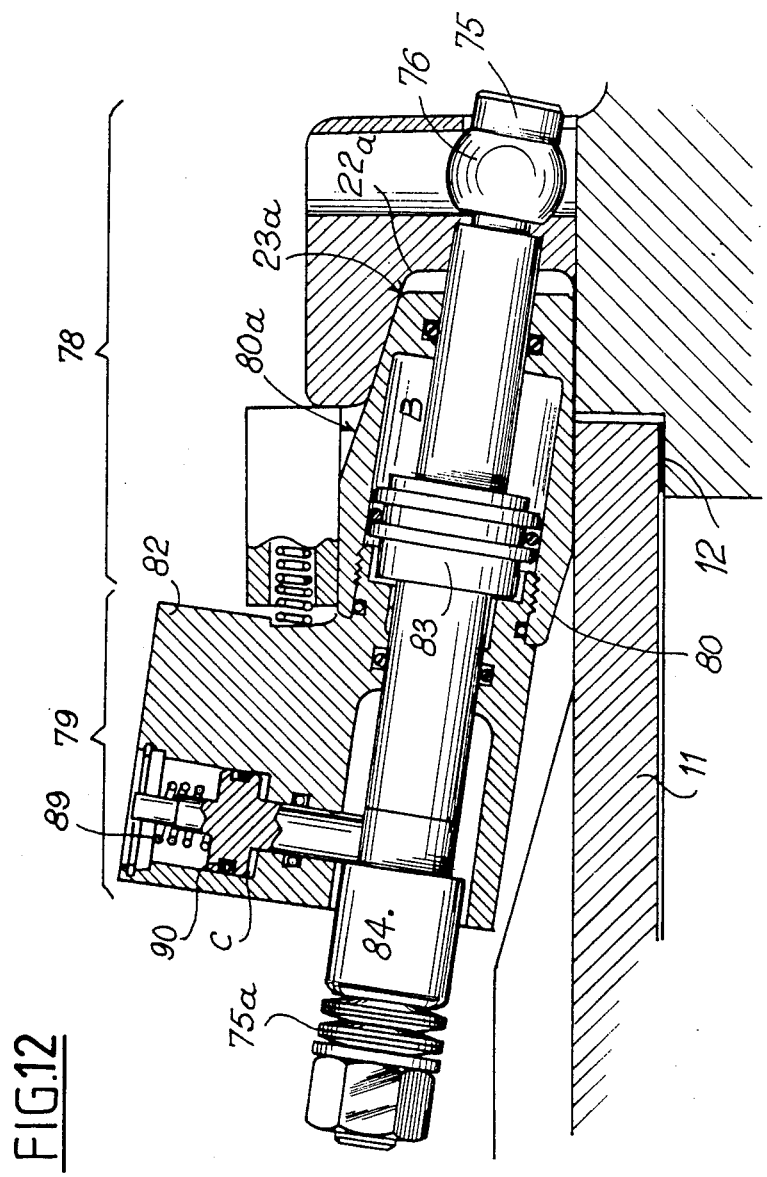
FIG. 12 is a view similar to that shown in FIG. 11, showing the clamping device in the tightened position.
Figure 13:
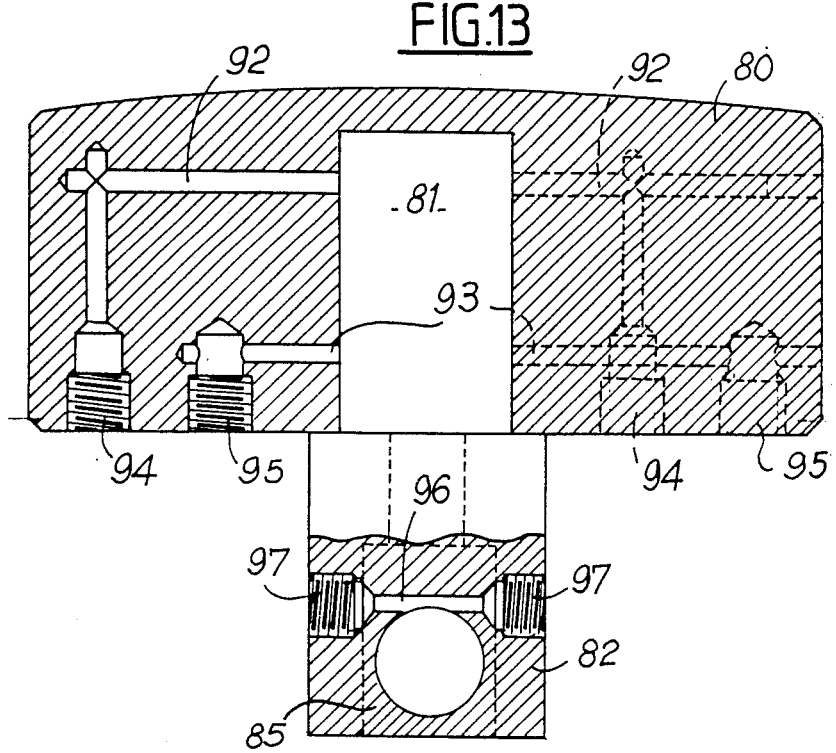
FIG. 13 is a cross-sectional view of the clamping jack, showing the various ducts formed in the body of the loading jack and in the body of the locking system.
Figure 14:
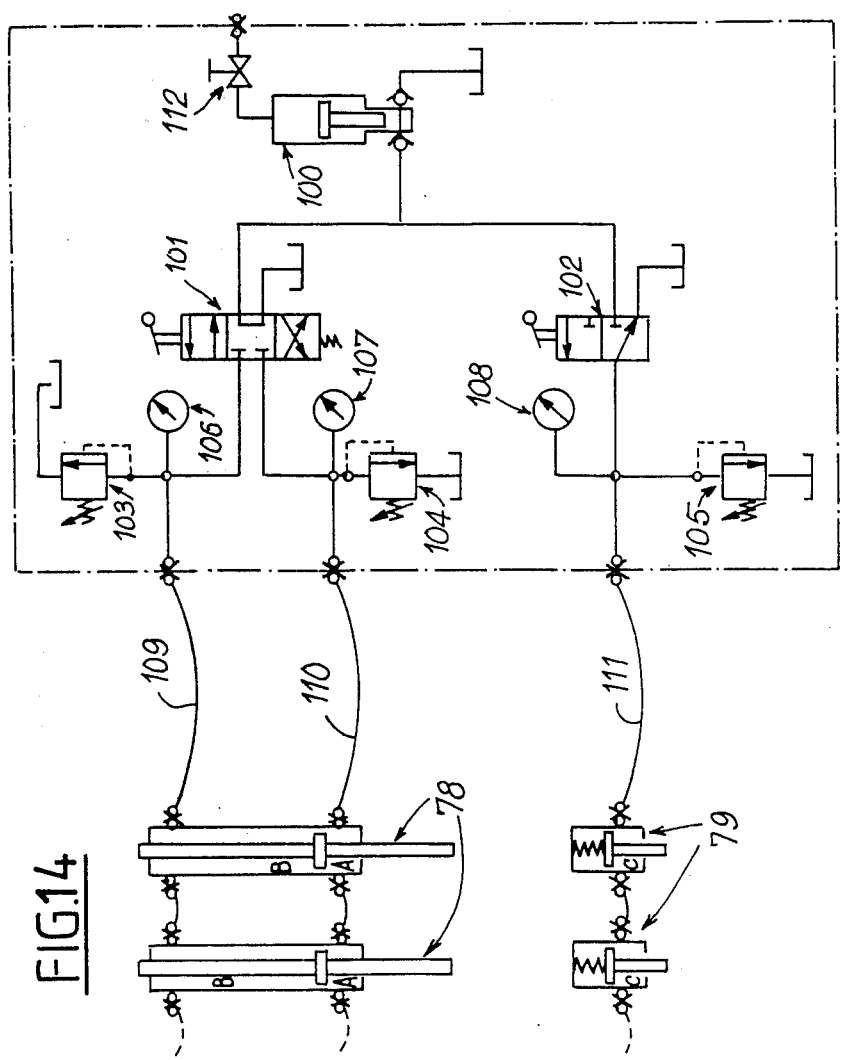
FIG. 14 shows a block diagram of the hydraulic connections ensuring the operation of the automatic clamping device.

Another alternative form of the clamping device is shown in FIG. 8.

This alternative form is more particularly applicable to steam generators which have already been installed and are equipped with shutting means according to the prior art.

In this caes, the water box of the steam generator comprises a circular bearing seat which is welded as near as possible to the tube connections. Fixing of the shutter plate was achieved by means of direct-action screws fitted into the periphery of the said plate in a direction which is perpendicular to the latter, the said screws being screwed into the bearing seat which has threaded blind holes for this purpose.

In FIG. 8 the orifice 7 to be shut off is thus equipped with a circular bearing seat 50 provided with blind holes 51.

The shutter plate 11 and the seal 12 bear upon the circular seat 50. The carrier ring 55 with trapezoidal channel 56 is mounted on the circular seat 50 by means of studs 57 which are screwed into the blind holes 51, and is held in place by nuts 58 restrained by the screws 59.

As in the preceding examples, the shutter plate 11 and the seal 12 are held by wedges 60 which enter the trapezoidal channel 56.

In order to allow the passage of the nuts 58 for the studs 57, the wedges 60 incorporate a cavity 61.

Locking of the wedges 60 is achieved in the same way as was described above, by means of locking screws which interact with the carrier ring 55.

This device makes it possible to considerably reduce the clamping prestress developed in each locking screw. This prestress is in fact substantially equal to the mathematical product made up of the sum of the stess in the bottom and the seating stress in the seal, multiplied by the value of the tangent of the angle $\alpha$ of the inclined face of the trapezoidal channel.

FIGS. 9 to 14 show a third alternative embodiment of the clamping device.

In this example, the closing plate 11 is retained in the recess 24 by means of a series of jacks, each designated as a whole by the reference numeral 70.

The clamping jacks 70 are connected to one another by means of one or more circular crown-ring sectors 71, to form on the perimeter of the closing plate 11, for example, four stringers 72, each composed of five clamping jacks 70, as shown in FIG. 9. The clamping jacks 70 are joined to the circular crown-ring sector 71 one by one by means of two guide screws 73 (FIG. 10), each inserted into one of the oblong slots 74 provided in the sector 71, and then screwed into the jack 70 until they stop, as will be described in more detail later.

Each clamping jack 70 is connected to the carrier ring 21a by means of a bolt 75 associated with an anchoring ball 76 arranged in a cylindrical housing 77 made in the said carrier ring 21a and bearing on the head of the bolt 75.

The illustration given in FIG. 3 makes it possible to visualize one of the twenty clamping jacks 70 forming the device according to the invention in the rest state.

Each of these jacks 70 sconsists of two subassemblies, each comprising a loading jack 78 and its locking system 79.

The loading jack 78 is formed by a body 80 having an inner cavity 81, into which the body 82 of the locking system 79 is screwed.

The shank of the bolt 75 passes through the body 80 of the loading jack 78 and the body 82 of the locking system 79. Mounted on this shank are, on the one hand, a piston 83 arranged in the cavity 81 of the body 80 and, on the other hand, a locking stop 84 positioned in an inner recess 85 provided inside the body 82 of the locking system. The piston 83 delimits two small chambers A and B in the inner cavity 81 of the body 80.

The piston 83 and the locking stop 84 are both kept under a constant and predetermined load as a result of the action of elastic elements, such as, for example, a spring or "Belleville" washers 75a prestressed by means of the nut 75b. These "Belleville" washers 75a ensure a constant load of 200 kg per bolt 75 over a compresion range which makes it possible to ignore the production tolerances of the components. The shank of the bolt 75, besides performing its function of absorbing the tensile forces during the tightening phase, also performs the function of a spindle for the axial guidance of the piston 83 and the locking stop 84.

As illustrated in FIG. 6, the body 80 of the loading jack 78 consists of a bar in the form of a circular sector, the outer profile of which matches the inner surface of the trapezoidal channel 22a of the carrier ring 21a. The wedge-shaped profile of the body 80 (FIG. 3) has an upper face 80a partially inclined at an angle of the same value as the angle of the sloping face of the trapezoidal channel 22a of the carrier ring, namely 15°. The lower face of the body 80 bears on the closing plate 11.

The upper face of the body 80 also has a horizontal part 80b, on top of which is arranged the circular crown-ring sector 71, also forming a handling flange which performs a dual function.

The first is to allow easy handling and fitting on the carrier ring 21a, ensuring that a stringer 72 comprising five clamping jacks 70 is formed. As indicated above, the clamping jacks 70 are joined to the circular crown-ring sector 71 one by one by means of the two guide screws 73 which are screwed until they stop into the body 80 of each loading jack 78. The connection made in this way allows the circular crown-ring sector 71 to move radially relative to the carrier ring 21a.

The second function of the circular crown-ring sector 71 is to individualize the inherent characteristics which can be the cause of a delay in the movement of one jack relative to the others, thus resulting in instability of the said circular crown-ring sector.

To prevent this, a flexible connection is provided between the body 80 of each loading jack 78 and the circular crown-ring sector 71. It is made by means of the combination of the oblong slots 74, associated with the guide screws 73, with a series of pairs of springs 86, each housed in a blind hole 87 and bearing on the body 82 of the locking system 79, this assembly thus ensuring that the position of each jack is coordinated relative to the circular crown-ring sector 71.

Arranged in the body 82 of the locking system 79, shown in the rest state in FIG. 4, is a catch finger 88 which comes up against the locking stop 84 strung on to the shank of the bolt 75. The catch finger 88 takes the form of a single-acting mini-jack, the spring 89 of which ensures automatic indexing during the clamping phase. The catch finger 88 has a piston 90 which delimits a small chamber C in the body 82. The upper end of the piston 90 projects in the released position and can be used as a visual indicator of the position of the catch finger 88.

The body 82 of the locking system is screwed directly on to the body 80 of the loading jack 78 in the axis of the inner cavity 81 of the latter. This connection and that of the rest of the clamping device are sealed off by means of a series of O-ring seals 91.

To reduce the mass of each of the stringers 72 to a minimum and thus make it easier to introduce them into the steam generator and fit them in place, all the components forming the clamping device, except for the bolt 75, the ball 76, the "Belleville" washers 75a, the locking stop 84 and the catch finger 88, are produced from a light alloy with anodic oxidation. The mass obtained in this way for each stringer 72 is approximately 6.5 kg.

The chambers A and B of the body 80 of the loading jack 78 are fed respectively by means of small ducts 92 and 93, each having a double inlet 94 and 95, making it possible to connect the jacks to one another by means of flexible hydraulic connections equipped with self-sealing unions (FIG. 6). The chamber C of the locking system 79 is likewise fed by means of a small duct 96 having a double inlet 97. The hydraulic pressures required during the tightening, releasing and unlocking phases are supplied by a hydraulic unit, the block diagram of which is shown in FIG. 7.

This hydraulic unit comprises:

a hydro-pneumatic pump 100, for example of a minimum of 100 bars, fed by means of the compressed-air system via an air-conditioner (not shown);

a manually controlled distributor 101 making it possible to admit the pressure during the tightening or releasing phases;

a manually controlled distributor 102 making it possible to admit the pressure during the unlocking phase;

three valves 103, 104 and 105 set respectively to the tightening pressure P1, releasing pressure P2 and unlocking pressure P3. The pressure P1 will have, for example, a value of approximately 45 bars, to obtain at least a load of 200 kg, in order to overcome the forces attributable to possible seizures, the releasing pressure P2 will have a value of, for example, 70 bars, resulting in a useful effect of 310 kg, and finally the unlocking pressure P3 will have a value of, for example, 10 bars;

three pressure gauges 106, 107 and 108, each indicating one of the three operating pressures.

The hydraulic fluid used is water, thus avoiding any risk of contamination in the event of accidental leakage.

Putting the automatic clamping device into operation for the closing-off stage involves the following steps:

First of all, each of the four stringers 72 is brought up and fitted on the carrier ring 21a in succession, the four stringers are connected hydraulically to one another, and then the three flexible supply lines 109, 110 and 111, shown in the hydraulic block diagram of FIG. 7, are connected to one of the jacks 70. The pump 100 of the hydraulic unit is started up by opening the cock 112.

Action is taken on the distributor 101 to pressurize the chamber B of each loading jack 78 simultaneously to the pressure P1. This pressure increase first results in the movement of the body 80 of each loading jack 78 and then, after the latter is wedged in the trapezoidal channel 22a of the carrier ring 21a, in the combined movement of the piston 83 and the stop 84 which then causes the compression of the "Belleville" washers 75a, thus ensuring a sufficient shift of the locking stop 84 to allow the automatic indexing of the catch finger 88 (FIG. 5).

The proper locking of the twenty catch fingers 88 is checked visually, and then the three flexible supply lines 109, 110 and 111 are disconnected.

The sliding of the sloping face 80a of each body 80 on the sloping face 23a of the carrier ring 21a results in a compressive force of the body 80 on the closing plate 11 which in turn compresses the gasket 12.

The stage of removing the automatic clamping device involves the following steps:

First of all, the three flexible supply lines 109, 110 and 111 are connected, and then action is taken on the distributor 101 to pressurize the chamber 8 of each loading jack 78 simultaneously to the pressure P1, in order to recompress the "Belleville" washers 75a and unlock each of the twenty catch fingers 88.

Action is taken on the distributor 102 to pressurize the chamber C of each locking piston 83, thus allowing the catch finger 88 to retract, this retraction being checked visually by the appearance of the upper end of the locking piston. Action is taken on the distributor 101 to pressurize the chamber A of each loading jack 88 simultaneously to the pressure P2, thus causing the body 80 of each loading jack 77 to become unwedged and moved rearwards. The distributor 102 is returned to the initial position, the three flexible supply lines 109, 110 and 111 are disconnected, and the connections between the four stringers 72 are broken.

Subsequently, all that is necssary is to remove each of the four stringers 72 from the carrier ring 21a in succession.

This hydraulic supply of the clamping jacks is carried out in series, allows the pressures to be equalized and makes it possible to obtain a constant pressure and the same stress for all the jacks.

Furthermore, such automation on the one hand offers the advantage of reducing the radiation dose received by the attendance crew, this being due to the decrease in the time for clamping the closing plate which proportionately reduces the time spent in the active zone formed by the water box of the steam generator, and on the other hand makes it possible to benefit from a uniform reduction and better control of the mechanical stresses generated as a result of the clamping force.

The clamping device has been described in the general terms of an orifice of circular cross-section, but the form of the elements can, of course, be adapted to another orifice shape. Moreover, the invention has been described particularly with regard to steam generators, but can obviously have other uses.

I claim:

1. Device for the installation and retention of a shutter plate (11) for an orifice (7, 8) in an enclosure comprising a carrier ring (21, 21a, 55) fixed to the perimeter of an orifice to be shut, wherein the carrier ring (21, 21a, 55) has an internal channel (22, 22a, 56) with an inclined face (23, 23a) within which are positioned clamping wedges (25, 35, 60, 80) which bear upon the periphery of a shutter plate (11) and which, under the effect of locking members (27, 37, 70), cooperate with the carrier ring (21, 21a, 55) and move individually within the channel in a downward radial direction to exert a compressive force on the shutter plate.

2. Device according to claim 1, wherein the upper faces of the clamping wedges (25, 35, 60, 80) and the internal channel (22, 22a, 46) are inclined at an angle greater than the angle of friction of the two materials coming into contact.

3. Device according to claim 1, wherein the locking member consist of a series of jacks (70) which are arranged on the periphery of the closing plate (11), and the simultaneous actuation of which, obtained by means of a single control, makes it possible to act uniformly and individually on each clamping wedge (80).

4. Device according to claim 3, wherein the clamping jacks (70) are joined to one another by means of at least one circular crown-ring sector (71) so as to form one or more independent stringers (72) covering the perimeter of the closing plate (11).

5. Device according to claim 3, wherein each clamping jack (70) is formed by two sub-assemblies, each comprising a loading jack (78), having a body (80) which forms a said clamping wedge, and a body (82) of a locking system (79).

6. Device according to claim 5, wherein the body (80) of the loading jack (78) consists of a bar in the form of a circular sector whose outer profile matches the inner surface of the trapezoidal channel (22a) of the carrier ring (21a) and has an upper face (80a) partially inclined at an angle of the same value as the angle of the sloping face (23a) of the trapezoidal channel (22a).

7. Device according to claim 3, wherein the clamping jacks (70) are joined to the circular crown-ring sector (71) one by one by flexible connection means allowing the circular crown-ring sector (71) to move radially relative to the carrier ring (21a) and making it possible to coordinate the position of each jack (70) relative to the circular crown-ring sector.

8. Device according to claim 7, wherein the flexible connection means consist, for each clamping jack (70), of two guide screws (73), each inserted into an oblong slot (74) provided in the circular crown-ring sector (71) and screwed into the body (80) of the loading jack (78) until they stop, and of a series of pairs of restoring springs (86), each housed in a blind hole (87) of the circular crown-ring sector and bearing on the locking system (79).

9. Device according to one of claim 3, wherein each clamping jack (70) is connected to the carrier ring (21a) by means of a bolt (75) associated with an anchoring ball (76) arranged in a cylindrical housing (77) made in the carrier ring (21a).

10. Device according to claim 9, wherein the shank of the bolt (75) passes through the body (80) of the loading jack (78) and the body (82) of the locking system (79) which is screwed directly onto the body (80) of the loading jack (78) in the axis of the latter.

11. Device according to claim 10, including, mounted on the shank of the bolt (75), a piston (83) arranged in a cavity (81) of the body (80) of the loading jack (78) and delimiting two small chambers A and B in the latter, and a locking stop (84) positioned in a recess (85) provided inside the body (82) of the locking system (79).

12. Device according to claim 11, wherein the piston (83) and the locking stop (84) are both kept under a constant and predetermined load as a result of the action of at least one elastic element, such as, for example, a spring or "Belleville" washers (75a).

13. Device according to claim 5, including a catch finger (88) interacting with the stop (84) strung on the shank of the bolt (75) and forming, in the body (82) of the locking system, a small single-acting jack.

14. Device according to claim 3, wherein the hydraulic pressures required during the tightening, releasing and unlocking phases are supplies by a hydraulic unit connected to one of clamping jacks (70), the said jacks (70) being connected in series to one another.

15. Device according to claim 1, wherein the locking members (27, 37) are screws.

16. Device according to claim 1, wherein the clamping wedges (25, 35, 60) are joined together by connecting means (31, 32) to form one or more independent chains (30) covering the perimeter of the shutter plate (11).

17. Device according to claim 16, wherein the connecting means consist of link bars (31) which join the clamping wedges (25, 35, 60) together in pairs and which are pivoted at each end about a hinge pin consisting of a locating screw (32) fixed to the upper face of said wedges (25, 35, 60).

18. Device according to claim 1, wherein each clamping wedge (25, 35, 60) consists of a small bar which forms an arc of a circular ring whose external contour corresponds to the internal radius of the inner channel (22).

19. Device according to claim 1 wherein each clamping wedge (25, 35, 60) has a hole (26; 36) in the middle arranged in a radial manner so as to accommodate the locking member (27, 37) which interacts with the carrier ring (21, 55).

20. Device according to claim 1, wherein the carrier ring (21, 55) comprises recesses (29) spaced at regular intervals on the upper part of its periphery for fitting the locking members (27, 37).

21. Device according to claim 1, wherein the carrier ring (55) is mounted on a circular bearing seat fixed onto the perimeter of the orifice to be shut off.

* * * * *